`US010680877B2`

(12) United States Patent
Ding et al.

(10) Patent No.: US 10,680,877 B2
(45) Date of Patent: Jun. 9, 2020

(54) INFORMATION TRANSMISSION, SENDING, AND ACQUISITION METHOD AND DEVICE

(71) Applicants: Beijing Jingdong Shangke Information Technology Co., Ltd., Beijing (CN); Beijing Jingdong Century Trading Co., Ltd., Beijing (CN)

(72) Inventors: Jun Ding, Beijing (CN); Deqiang Lin, Beijing (CN)

(73) Assignees: Beijing Jingdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 85 days.

(21) Appl. No.: 16/082,990

(22) PCT Filed: Jan. 6, 2017

(86) PCT No.: PCT/CN2017/070393
§ 371 (c)(1),
(2) Date: Sep. 7, 2018

(87) PCT Pub. No.: WO2017/152711
PCT Pub. Date: Sep. 14, 2017

(65) Prior Publication Data
US 2019/0097875 A1    Mar. 28, 2019

(30) Foreign Application Priority Data
Mar. 8, 2016    (CN) .......................... 2016 1 0129937

(51) Int. Cl.
*H04L 12/24*    (2006.01)
*H04L 1/22*    (2006.01)
(Continued)

(52) U.S. Cl.
CPC ............ *H04L 41/0659* (2013.01); *H04L 1/22* (2013.01); *H04L 41/06* (2013.01); *H04L 41/0654* (2013.01);
(Continued)

(58) Field of Classification Search
None
See application file for complete search history.

(56) References Cited

U.S. PATENT DOCUMENTS 5,473,599 A  *  12/1995  Li ........................ G06F 11/2005
                                                          370/219
5,835,696 A  *  11/1998  Hess .................. G06F 11/2005
                                                          714/10
(Continued)

FOREIGN PATENT DOCUMENTS

| CN | 101252505 A | 8/2008 |
|----|-------------|--------|
| CN | 102624565 A | 8/2012 |
| CN | 103701843 A | 4/2014 |

OTHER PUBLICATIONS

International Search Report for International Application No. PCT/CN2017/070393, dated Apr. 10, 2017, with English translation (5 pages).
(Continued)

*Primary Examiner* — Andrew C Oh
(74) *Attorney, Agent, or Firm* — Nixon Peabody LLP

(57) ABSTRACT

An information transmission, sending, and acquisition method and device. A method includes: using a master and slave relay terminal in an information relay terminal pair at the head of an information relay terminal pair queue to synchronously receive information sent by a sending terminal, and using the master relay terminal to transmit information to a receiving terminal; when a fault occurs in the master or slave relay terminal at the head of the queue, stopping using the master and slave relay terminals to
(Continued)

receive information, and deleting the information relay terminal pair from the queue; after the slave or master relay terminal in the deleted terminal pair transmits all the information to the receiving terminal and the fault of the master or slave relay terminal is removed, inserting the terminal pair to the tail of the queue; and meanwhile, when the fault occurs in the master or slave relay terminal, using the next adjacent terminal pair to continue receiving the information. The invention implements strictly-ordered and efficient information transmission.

14 Claims, 7 Drawing Sheets

(51) Int. Cl.
  H04L 29/14    (2006.01)
  H04L 12/703   (2013.01)
  H04L 12/801   (2013.01)
  H04L 12/803   (2013.01)
  H04L 29/08    (2006.01)
  H04L 12/939   (2013.01)

(52) U.S. Cl.
  CPC ...... H04L 41/0663 (2013.01); H04L 41/0668 (2013.01); H04L 41/0672 (2013.01); H04L 45/28 (2013.01); H04L 47/12 (2013.01); H04L 47/122 (2013.01); H04L 47/125 (2013.01); H04L 47/127 (2013.01); H04L 49/557 (2013.01); H04L 67/1034 (2013.01); H04L 69/40 (2013.01)

(56) References Cited

U.S. PATENT DOCUMENTS

| | | | | |
|---|---|---|---|---|
| 6,335,927 B1* | 1/2002 | Elliott | H04L 12/14 | 370/352 |
| 6,421,349 B1* | 7/2002 | Grover | H04J 3/14 | 370/227 |
| 6,952,395 B1* | 10/2005 | Manoharan | H04J 14/0227 | 370/219 |
| 6,978,394 B1* | 12/2005 | Charny | H04L 45/00 | 370/228 |
| 7,391,732 B1* | 6/2008 | Cortez | H04L 41/0668 | 370/238 |
| 7,469,279 B1* | 12/2008 | Stamler | H04L 41/0672 | 709/220 |
| 7,818,408 B1* | 10/2010 | Ignatuk | G06F 11/2033 | 370/252 |
| 7,827,136 B1* | 11/2010 | Wang | G06F 11/2094 | 707/610 |
| 8,069,366 B1* | 11/2011 | Wenzel | H04L 41/069 | 711/147 |
| 8,077,726 B1* | 12/2011 | Kumar | H04L 45/22 | 370/395.31 |
| 8,191,078 B1* | 5/2012 | Cullen | G06F 11/1443 | 707/610 |
| 8,248,913 B1* | 8/2012 | Liu | H04L 45/28 | 370/216 |
| 8,929,856 B1* | 1/2015 | Kamboh | H04L 61/1511 | 455/404.2 |
| 9,100,329 B1* | 8/2015 | Jiang | H04L 45/28 | |
| 9,160,617 B2* | 10/2015 | Alvarez-Icaza Rivera | H04L 49/1523 | |
| 9,485,163 B1* | 11/2016 | Fries | H04L 41/0668 | |
| 9,893,940 B1* | 2/2018 | Chawla | G06F 16/84 | |
| 2003/0065811 A1* | 4/2003 | Lin | H04L 41/0896 | 709/232 |
| 2003/0074596 A1* | 4/2003 | Mashayekhi | G06F 11/1666 | 714/4.1 |
| 2003/0117950 A1* | 6/2003 | Huang | H04L 45/00 | 370/220 |
| 2004/0109407 A1* | 6/2004 | Grover | H04L 41/0663 | 370/218 |
| 2004/0165607 A1* | 8/2004 | Carnevale | H04L 41/0663 | 370/412 |
| 2004/0255049 A1* | 12/2004 | Italiano | H04L 12/4641 | 709/250 |
| 2005/0005001 A1* | 1/2005 | Hara | G06F 11/20 | 709/221 |
| 2005/0015460 A1* | 1/2005 | Gole | H04L 29/06 | 709/213 |
| 2005/0050202 A1* | 3/2005 | Aiken, Jr. | G06F 9/5033 | 709/227 |
| 2005/0207337 A1* | 9/2005 | Oda | H04L 45/10 | 370/214 |
| 2005/0243497 A1* | 11/2005 | Cameron | H04L 69/40 | 361/119 |
| 2005/0243713 A1* | 11/2005 | Okuda | H04L 47/10 | 370/216 |
| 2006/0013210 A1* | 1/2006 | Bordogna | H04L 45/00 | 370/389 |
| 2006/0077888 A1* | 4/2006 | Karam | H04L 1/22 | 370/216 |
| 2006/0153067 A1* | 7/2006 | Vasseur | H04L 45/02 | 370/217 |
| 2006/0164976 A1* | 7/2006 | Grover | H04L 45/00 | 370/228 |
| 2007/0008880 A1* | 1/2007 | Buchko | H04L 45/00 | 370/218 |
| 2007/0086333 A1* | 4/2007 | Doukai | H04L 45/48 | 370/228 |
| 2007/0147231 A1* | 6/2007 | Yoshida | H04L 45/50 | 370/216 |
| 2007/0286069 A1* | 12/2007 | Xu | H04L 41/0677 | 370/218 |
| 2007/0288585 A1* | 12/2007 | Sekiguchi | G06F 11/2038 | 709/209 |
| 2008/0031263 A1* | 2/2008 | Ervin | H04L 12/4641 | 370/397 |
| 2008/0049763 A1* | 2/2008 | Damm | H04L 12/4625 | 370/400 |
| 2008/0109526 A1* | 5/2008 | Subramanian | H04L 67/1097 | 709/212 |
| 2008/0168302 A1* | 7/2008 | Cagno | H04L 1/22 | 714/5.1 |
| 2008/0181233 A1* | 7/2008 | Washam | H04L 12/2859 | 370/395.5 |
| 2008/0232375 A1* | 9/2008 | Hachiya | H04L 43/00 | 370/392 |
| 2008/0281987 A1* | 11/2008 | Skalecki | H04L 12/4658 | 709/253 |
| 2008/0298236 A1* | 12/2008 | Ervin | H04L 47/10 | 370/232 |
| 2008/0320259 A1* | 12/2008 | Garg | G06F 11/2041 | 711/162 |
| 2009/0003211 A1* | 1/2009 | Akyamac | H04J 14/0284 | 370/235 |
| 2009/0034971 A1* | 2/2009 | Sadanada | H04L 43/0811 | 398/49 |
| 2009/0046587 A1* | 2/2009 | Kothari | H04L 45/12 | 370/238 |
| 2009/0249001 A1 | 10/2009 | Narayanan et al. | | |
| 2009/0316584 A1* | 12/2009 | Tanaka | H04L 12/4675 | 370/238 |
| 2009/0323696 A1* | 12/2009 | Schwan | H04L 67/104 | 370/395.31 |
| 2010/0039935 A1 | 2/2010 | Davison et al. | | |
| 2010/0042715 A1* | 2/2010 | Tham | G06F 11/2025 | 709/224 |
| 2010/0095004 A1 | 4/2010 | Zuckerman | | |
| 2010/0162036 A1* | 6/2010 | Linden | G06F 11/181 | 714/4.11 |
| 2010/0302935 A1* | 12/2010 | Zhang | H04L 45/02 | 370/218 |

(56) References Cited

U.S. PATENT DOCUMENTS

| | | | |
|---|---|---|---|
| 2011/0276825 A1* | 11/2011 | Dong | H04L 41/0654 714/15 |
| 2012/0033549 A1* | 2/2012 | Joshi | H04L 41/0663 370/228 |
| 2012/0124431 A1* | 5/2012 | Bauer | H04L 41/0663 714/55 |
| 2012/0188867 A1* | 7/2012 | Fiorone | H04L 45/00 370/218 |
| 2012/0287937 A1 | 11/2012 | Kaya et al. | |
| 2013/0003532 A1* | 1/2013 | Vinod | H04L 43/0811 370/225 |
| 2013/0083652 A1* | 4/2013 | Cheung | H04L 45/28 370/228 |
| 2013/0094355 A1* | 4/2013 | Nakash | H04L 45/28 370/228 |
| 2013/0219252 A1* | 8/2013 | Satyarthi | G06F 11/0751 714/799 |
| 2013/0232259 A1* | 9/2013 | Csaszar | H04L 43/0817 709/224 |
| 2013/0339783 A1* | 12/2013 | Fernandez Alonso | H04L 12/1407 714/4.11 |
| 2014/0003227 A1* | 1/2014 | Scudder | H04L 45/021 370/218 |
| 2014/0006845 A1* | 1/2014 | Madaiah | H04L 45/48 714/4.1 |
| 2014/0092726 A1* | 4/2014 | Khan | H04L 45/64 370/221 |
| 2014/0136684 A1* | 5/2014 | Jain | H04L 41/069 709/224 |
| 2014/0204728 A1 | 7/2014 | Kobayashi et al. | |
| 2014/0219080 A1* | 8/2014 | Kim | H04L 45/22 370/221 |
| 2014/0219081 A1* | 8/2014 | Natarajan | H04L 45/28 370/228 |
| 2014/0286154 A1* | 9/2014 | O'Connor | H04L 41/0659 370/218 |
| 2014/0362731 A1* | 12/2014 | Wijnands | H04L 12/18 370/254 |
| 2014/0379895 A1* | 12/2014 | Jain | H04L 41/0654 709/224 |
| 2015/0003232 A1* | 1/2015 | Friskney | H04L 41/0681 370/228 |
| 2015/0009808 A1* | 1/2015 | Bejerano | H04L 41/0659 370/228 |
| 2015/0016241 A1* | 1/2015 | Ruffini | H04W 40/28 370/216 |
| 2015/0016245 A1* | 1/2015 | Ra | H04L 45/28 370/228 |
| 2015/0063360 A1* | 3/2015 | Thakkar | H04L 45/745 370/400 |
| 2015/0085647 A1* | 3/2015 | Hu | H04L 47/30 370/228 |
| 2015/0113313 A1* | 4/2015 | Chen | G06F 11/2007 714/4.11 |
| 2015/0117179 A1* | 4/2015 | Sato | H04L 45/28 370/219 |
| 2015/0172111 A1* | 6/2015 | Lalsangi | H04L 67/1042 709/220 |
| 2015/0172173 A1* | 6/2015 | Mitsumori | H04L 45/28 370/225 |
| 2015/0180766 A1* | 6/2015 | Racz | H04L 47/122 370/218 |
| 2015/0186216 A1* | 7/2015 | Lee | H04L 45/128 714/4.2 |
| 2015/0207677 A1* | 7/2015 | Choudhury | H04L 41/0806 370/254 |
| 2015/0207724 A1* | 7/2015 | Choudhury | H04L 41/12 370/255 |
| 2015/0271008 A1* | 9/2015 | Jain | G06F 11/079 714/57 |
| 2015/0295817 A1* | 10/2015 | Xu | G06F 11/079 709/224 |
| 2015/0326427 A1* | 11/2015 | Ali | H04L 12/64 370/228 |
| 2015/0372856 A1* | 12/2015 | Cheng | H04L 41/06 370/217 |
| 2015/0372902 A1* | 12/2015 | Giorgetti | H04L 45/64 370/219 |
| 2016/0034361 A1* | 2/2016 | Block | H04L 63/1416 714/4.12 |
| 2016/0036625 A1* | 2/2016 | Hu | H04L 43/0811 370/228 |
| 2016/0036693 A1* | 2/2016 | Galdy | G06F 9/00 709/219 |
| 2016/0057009 A1* | 2/2016 | Kadayam | G06F 11/2069 709/221 |
| 2016/0149752 A1* | 5/2016 | Belanger | H04L 43/08 370/216 |
| 2016/0344620 A1* | 11/2016 | G. Santos | H04L 41/0636 |
| 2017/0005915 A1* | 1/2017 | Mirsky | H04L 45/26 |
| 2017/0117957 A1* | 4/2017 | Bottari | H04L 45/22 |
| 2017/0118067 A1* | 4/2017 | Vedula | H04L 41/0668 |

OTHER PUBLICATIONS

Written Opinion of International Searching Authority for International Application No. PCT/CN2017/070393, dated Apr. 10, 2017, with English translation (7 pages).

\* cited by examiner

200

┌─ 201
Using a master transfer terminal and a slave transfer terminal in an information transfer terminal pair arranged at the head of an information transfer terminal pair queue to synchronously receive information sent by an information sending terminal, and using the master transfer terminal to transmit the information to an information receiving terminal ┌─ 202
Stopping using the master transfer terminal and slave transfer terminal in the information transfer terminal pair at the head of the queue to receive information when a fault occurs in the master or slave transfer terminal in the information transfer terminal pair at the head of the queue, deleting the information transfer terminal pair at the head of the queue from the information transfer terminal pair queue, and inserting the deleted information transfer terminal pair to the tail of the information transfer terminal pair queue after the slave or master transfer terminal in the deleted information transfer terminal pair transmits all the information to the information receiving terminal and the fault of the master or slave transfer terminal is resolved ┌─ 203
Using a next information transfer terminal pair adjacent to the information transfer terminal pair at the head of the queue to continuously receive the information sent by the information sending terminal while a fault is occurring in the master or slave transfer terminal in the information transfer terminal pair at the head of the queue

Fig. 2

INFORMATION TRANSMISSION, SENDING, AND ACQUISITION METHOD AND DEVICE

CROSS-REFERENCE TO RELATED APPLICATIONS

This application is a U.S. National Stage of International Application No. PCT/CN2017/070393, filed on Jan. 6, 2017, which claims priority to Chinese Patent Application No. 201610129937.8, filed on Mar. 8, 2016. Both of the aforementioned applications are hereby incorporated by reference in their entireties.

TECHNICAL FIELD

The present disclosure relates to the technical field of computers, specifically to the technical field of Internet information processing, and more specifically to a method and apparatus for transmitting, sending and acquiring information.

BACKGROUND

With the rapid development of the Internet technology, big data and cloud computing, the application of the information transmission technology has been more and more extensive. At present, in order to support and guarantee the sending and receiving of synchronous/asynchronous information between distributed applications, generally an information sending terminal first sends information to an information transfer terminal, and then an information receiving terminal acquires the information from the information transfer terminal.

However, when a fault (for example, a disk fault) occurs in the information transfer terminal, the entire information transmission system for transmitting information may become unavailable, and then the order of the transmitted information may be confusing, thereby resulting in that the information acquired by the information receiving terminal is inconsistent with the information sent by the information sending terminal.

SUMMARY

An objective of the present disclosure is to propose an improved method and apparatus for transmitting, sending and acquiring information, to solve the technical problems mentioned in the foregoing Background section.

In a first aspect, the present disclosure provides a method for transmitting information, and the method includes: using a master transfer terminal and a slave transfer terminal in an information transfer terminal pair arranged at a head of an information transfer terminal pair queue to receive information sent by an information sending terminal synchronously, and using the master transfer terminal to transmit information to an information receiving terminal, at least two information transfer terminal pairs being arranged in the information transfer terminal pair queue according to a preset sequence; when a fault occurs in the master or slave transfer terminal in the information transfer terminal pair at the head of the queue, stopping using the master transfer terminal and slave transfer terminal in the information transfer terminal pair at the head of the queue to receive information, and deleting the information transfer terminal pair at the head of the queue from the information transfer terminal pair queue; after the slave or master transfer terminal in the deleted information transfer terminal pair transmits all the information to the information receiving terminal and the fault of the master or slave transfer terminal is resolved, inserting the deleted information transfer terminal pair to a tail of the information transfer terminal pair queue; and while a fault is occurring in the master or slave transfer terminal in the information transfer terminal pair at the head of the queue, using a next information transfer terminal pair adjacent to the information transfer terminal pair at the head of the queue to continuously receive the information sent by the information sending terminal.

In some embodiments, the method further includes: sending sorting information of the information transfer terminal pair queue to the information sending terminal.

In some embodiments, the method further includes: sending sorting information of the information transfer terminal pair queue to the information receiving terminal.

In a second aspect, the present disclosure provides a method for sending information, and the method includes: receiving sorting information of an information transfer terminal pair queue, at least two information transfer terminal pairs being arranged in the information transfer terminal pair queue according to a preset sequence, and each information transfer terminal pair including a master transfer terminal and a slave transfer terminal; sending information to the master transfer terminal and the slave transfer terminal in the information transfer terminal pair arranged at a head of the information transfer terminal pair queue according to the sorting information; stopping sending the information when a fault occurs in the master or slave transfer terminal in the information transfer terminal pair at the head of the queue; and finding a next information transfer terminal pair adjacent to the information transfer terminal pair at the head of the queue, and continuously sending information to the found information transfer terminal pair.

In a third aspect, the present disclosure provides a method for acquiring information, and the method includes: receiving sorting information of an information transfer terminal pair queue, at least two information transfer terminal pairs being arranged in the information transfer terminal pair queue according to a preset sequence, and each information transfer terminal pair including a master transfer terminal and a slave transfer terminal; acquiring information from the master transfer terminal in the information transfer terminal pair at a head of the information transfer terminal pair queue according to the sorting information; acquiring information from a corresponding slave or master transfer terminal when a fault occurs in the master or slave transfer terminal in the information transfer terminal pair at the head of the queue; and finding a next information transfer terminal pair adjacent to the faulty information transfer terminal pair after all the information in the slave or master transfer terminal is acquired, and continuously acquiring information from the found information transfer terminal pair.

In a fourth aspect, the present disclosure provides an apparatus for transmitting information, and the apparatus includes: a transmission unit, for using a master transfer terminal and a slave transfer terminal in an information transfer terminal pair arranged at a head of an information transfer terminal pair queue to receive information sent by an information sending terminal synchronously, and using the master transfer terminal to transmit information to an information receiving terminal, at least two information transfer terminal pairs being arranged in the information transfer terminal pair queue according to a preset sequence; a fault processing unit, for, when a fault occurs in the master or slave transfer terminal in the information transfer terminal pair at the head of the queue, stopping using the master transfer terminal and slave transfer terminal in the information transfer terminal pair at the head of the queue to receive information, and deleting the information transfer terminal pair at the head of the queue from the information transfer terminal pair queue; after the slave or master transfer terminal in the deleted information transfer terminal pair transmits all the information to the information receiving terminal and the fault of the master or slave transfer terminal is resolved, inserting the deleted information transfer terminal pair to a tail of the information transfer terminal pair queue; and a receiving continuing unit, for, while a fault is occurring in the master or slave transfer terminal in the information transfer terminal pair at the head of the queue, using a next information transfer terminal pair adjacent to the information transfer terminal pair at the head of the queue to continuously receive the information sent by the information sending terminal.

In some embodiments, the apparatus further includes: a first sending unit, for sending sorting information of the information transfer terminal pair queue to the information sending terminal.

In some embodiments, the apparatus further includes: a second sending unit, for sending sorting information of the information transfer terminal pair queue to the information receiving terminal.

In a fifth aspect, the present disclosure provides an apparatus for sending information, and the apparatus includes: a receiving unit, for receiving sorting information of an information transfer terminal pair queue, at least two information transfer terminal pairs being arranged in the information transfer terminal pair queue according to a preset sequence, and each information transfer terminal pair including a master transfer terminal and a slave transfer terminal; a sending unit, for sending information to the master transfer terminal and the slave transfer terminal in the information transfer terminal pair arranged at a head of the information transfer terminal pair queue according to the sorting information; a sending terminating unit, for stopping sending the information when a fault occurs in the master or slave transfer terminal in the information transfer terminal pair at the head of the queue; and a sending continuing unit, for finding a next information transfer terminal pair adjacent to the information transfer terminal pair at the head of the queue, and continuously sending information to the found information transfer terminal pair.

In a sixth aspect, the present disclosure provides an apparatus for acquiring information, and the apparatus includes: a receiving unit, for receiving sorting information of an information transfer terminal pair queue, at least two information transfer terminal pairs being arranged in the information transfer terminal pair queue according to a preset sequence, and each information transfer terminal pair including a master transfer terminal and a slave transfer terminal; a first acquiring unit, for acquiring information from the master transfer terminal in the information transfer terminal pair at a head of the information transfer terminal pair queue according to the sorting information; a second acquiring unit, for acquiring information from a corresponding slave or master transfer terminal when a fault occurs in the master or slave transfer terminal in the information transfer terminal pair at the head of the queue; and a third acquiring unit, for finding a next information transfer terminal pair adjacent to the faulty information transfer terminal pair after all the information in the slave or master transfer terminal is acquired, and continuously acquiring information from the found information transfer terminal pair.

In a seventh aspect, the present disclosure provides an information transmission system which includes a sending terminal, a transferring terminal and a receiving terminal. The transferring terminal includes the apparatus according to any one of claims 6-8, the sending terminal includes the apparatus according to claim 9, and the receiving terminal includes the apparatus according to claim 10.

According to the method and apparatus for transmitting, sending and acquiring information, a master transfer terminal and a slave transfer terminal in an information transfer terminal pair at the head of an information transfer terminal pair queue are first used to synchronously receive information according to an arrangement sequence of information transfer terminal pairs in the information transfer terminal pair queue, and the master transfer terminal is used to transmit information to an information receiving terminal; when a fault occurs in the master or slave transfer terminal in the information transfer terminal pair at the head of the queue, the master and slave transfer terminal in the information transfer terminal pair are stopped receiving information, and the information transfer terminal pair at the head of the queue is deleted from the information transfer terminal pair queue; after the slave or master transfer terminal in the deleted information transfer terminal pair transmits all the information to the information receiving terminal and the fault of the master or slave transfer terminal is resolved, the deleted information transfer terminal pair is inserted to the tail of the information transfer terminal pair queue; and while a fault is occurring in the master or slave transfer terminal in the information transfer terminal pair at the head of the queue, a next information transfer terminal pair adjacent to the information transfer terminal pair at the head of the queue is used to continuously receive the information sent by the information sending terminal, thus realizing strictly-ordered and efficient transmission of information.

BRIEF DESCRIPTION OF THE DRAWINGS

Other features, objectives and advantages of the present disclosure will become more apparent by reading a detailed description of the nonrestrictive embodiments made with reference to the following drawings:

FIG. 2 is a flowchart of an embodiment of the method for transmitting information according to the present disclosure;

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
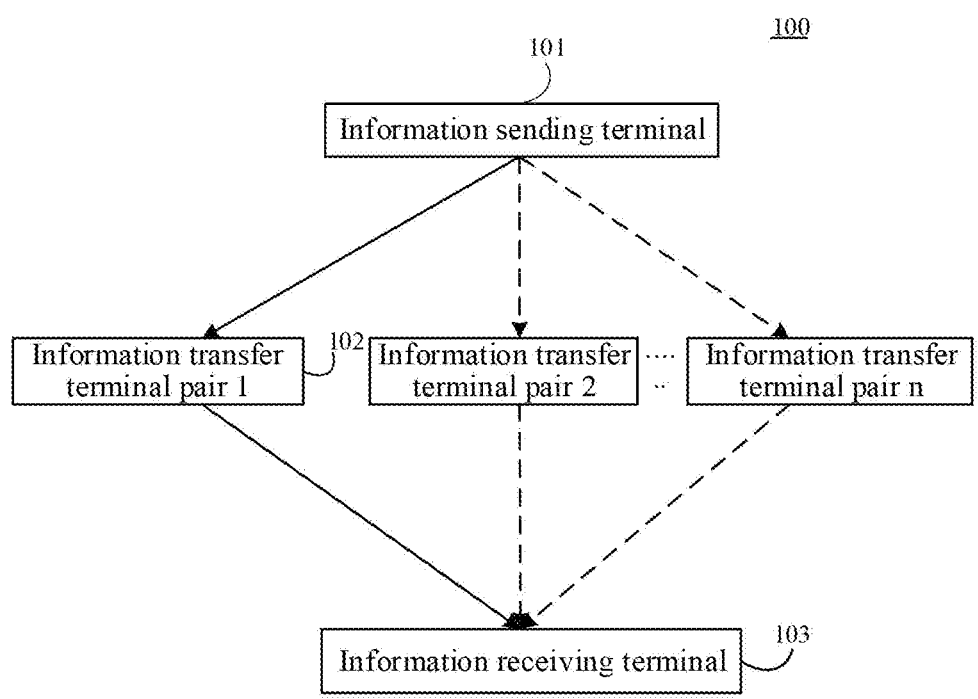
FIG. 1 is an architecture diagram of an examplary system in which the present disclosure may be implemented.

FIG. 1 shows an examplary system architecture 100 to which embodiments of the method or apparatus for transmitting, sending and acquiring information according to the present disclosure may be applied.

As shown in FIG. 1, the system architecture 100 may include an information sending terminal 101, an information transfer terminal pair 102, and an information receiving terminal 103. The information sending terminal 101 may send information to the information transfer terminal pair 102 through various connection types (e.g., a wired or wireless communication link, or an optical fiber cable, etc.), and the information receiving terminal 103 may acquire information from the information transfer terminal pair 102 through various connection types (e.g., a wired or wireless communication link, or an optical fiber cable, etc.).

The information sending terminal 101 may be various storage media (e.g., a memory, a magnetic disk, etc.) or various electronic devices capable of storing information, or may be a data processing system (e.g., a database system) capable of processing data. The information transfer terminal pair 102 may be various electronic devices capable of receiving, storing and transmitting information, and the functions of the information transfer terminal pair 102 may be realized by software, for example, message middleware may be used. The information transfer terminal pair 102 may include at least two information transfer terminal pairs, for example, an information transfer terminal pair 1, an information transfer terminal pair 2 . . . , and an information transfer terminal pair n. The information receiving terminal 103 may be various storage media or various electronic devices receiving and processing information, or may be a data processing system (e.g., a database system) capable of processing data. The various electronic devices include, but are not limited to, a smart phone, a tablet computer, an e-book reader, a MP3 (Moving Picture Experts Group Audio Layer III) player, an MP4 (Moving Picture Experts Group Audio Layer IV) player, a laptop portable computer, a desktop computer, and the like.

With further reference to FIG. 2, FIG. 2 shows a flow 200 of an embodiment of the method for transmitting information according to the present disclosure. The method for transmitting information, provided in the present embodiment, may be executed by a master control device that manages each information transfer terminal pair 102, the functions of the master control device may be realized by a master control server and may also be realized by a computer software program. The method includes the following steps.

Step 201, using a master transfer terminal and a slave transfer terminal in an information transfer terminal pair arranged at the head of an information transfer terminal pair queue to synchronously receive information sent by an information sending terminal, and using the master transfer terminal to transmit the information to an information receiving terminal.

In the present embodiment, the master control device for managing each information transfer terminal pair may sort at least two information transfer terminal pairs according to a preset sequence in advance. Each information transfer terminal pair includes a master transfer terminal and a slave transfer terminal. The master control device may use the master transfer terminal and the slave transfer terminal in the information transfer terminal pair arranged at the head of the information transfer terminal pair queue to synchronously receive information sent by the information sending terminal, and use the master transfer terminal to transmit the information to the information receiving terminal. At this time, the master transfer terminal in the information transfer terminal pair at the head of the queue runs normally, and the slave transfer terminal synchronously receives information identical to that of the master transfer terminal as a backup of the master transfer terminal but does not transmit the information.

Step 202, stopping using the master transfer terminal and slave transfer terminal in the information transfer terminal pair at the head of the queue to receive information when a fault occurs in the master or slave transfer terminal in the information transfer terminal pair at the head of the queue, deleting the information transfer terminal pair at the head of the queue from the information transfer terminal pair queue, and inserting the deleted information transfer terminal pair to the tail of the information transfer terminal pair queue after the slave or master transfer terminal in the deleted information transfer terminal pair transmits all the information to the information receiving terminal and the fault of the master or slave transfer terminal is resolved.

In the present embodiment, the master transfer terminal and slave transfer terminal in the information transfer terminal pair arranged at the head of the information transfer terminal pair queue are stopped receiving information when a fault occurs in the master or slave transfer terminal in the information transfer terminal pair arranged at the head of the information transfer terminal pair queue, and the information transfer terminal pair at the head of the queue is deleted from the information transfer terminal pair queue. The deleted information transfer terminal pair is inserted to the tail of the information transfer terminal pair queue after the slave or master transfer terminal in the deleted information transfer terminal pair transmits all the information to the information receiving terminal and the fault of the master or slave transfer terminal is resolved. That is, when a fault occurs an the master or slave transfer terminal in the information transfer terminal pair, neither the master transfer terminal nor the slave transfer terminal in the information transfer terminal pair may receive information any more, but the transfer terminal without a fault in the information transfer terminal pair may continue to transmit information to the receiving terminal until all the information received by the information transfer terminal pair is transmitted to the receiving terminal.

Step 203, using a next information transfer terminal pair adjacent to the information transfer terminal pair at the head of the queue to continuously receive the information sent by the information sending terminal while a fault is occurring in the master or slave transfer terminal in the information transfer terminal pair at the head of the queue.

In the present embodiment, the master control device uses the next information transfer terminal pair adjacent to the information transfer terminal pair at the head of the queue as the information transfer terminal pair at the head of the queue to continuously receive the information sent by the information sending terminal while a fault is occurring in the master or slave transfer terminal in the information transfer terminal pair at the head of the queue.

In some optional implementations of the present embodiment, the master control device may send the sorting information of the information transfer terminal pair queue to the information sending terminal. The sorting information may refer to the sorting order of each information transfer terminal pair in the information transfer terminal pair queue.

In some optional implementations of the present embodiment, the master control device may send the sorting information of the information transfer terminal pair queue to the information receiving terminal. The sorting information may refer to the sorting order of each information transfer terminal pair in the information transfer terminal pair queue.

Figure 3:
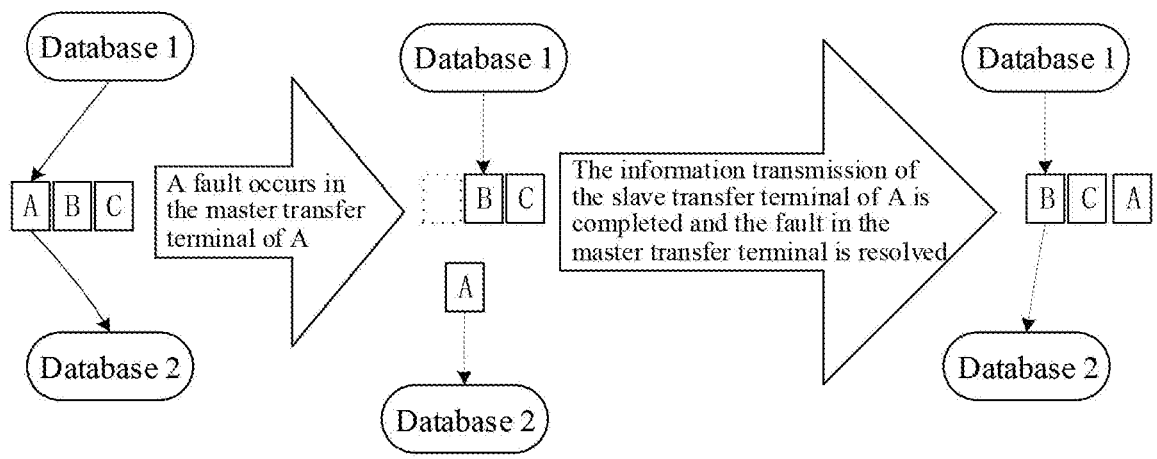
FIG. 3 is a schematic diagram of an application scenario of the method for transmitting information according to the present disclosure.

With further reference to FIG. 3, FIG. 3 is a schematic diagram or an application scenario of the method for transmitting information according to the present embodiment. The information synchronization between a database 1 and a database 2 is realized in the application scenario of FIG. 3. In this application scenario, an information transfer terminal pair A, an information transfer terminal pair B, and an information transfer terminal pair C are arranged in sequence respectively in the information transfer terminal pair queue. First, the information sent by the database 1 is synchronously received by the master transfer terminal and the slave transfer terminal in the information transfer terminal pair A arranged at the head of the queue, and the master transfer terminal in the information transfer terminal pair A is used to transmit information to the database 2. The master transfer terminal and the slave transfer terminal in the information transfer terminal pair A are stopped receiving information when a fault occurs in the master transfer terminal in the information transfer terminal pair A. The information transfer terminal pair A is deleted from the information transfer terminal pair queue, and the information transfer terminal pair A is inserted to the tail of the information transfer terminal pair queue after the slave transfer terminal in the information transfer terminal pair A transmits all information to the database 2 and the fault in the master transfer terminal is resolved. While a fault is occurring in the master transfer terminal in the information transfer terminal pair A, the information transfer terminal pair B adjacent to the information transfer terminal pair A is used to continuously receive the information sent by the information sending terminal.

The method provided by the above embodiment of the present disclosure realizes strictly-ordered and efficient transmission of information by arranging at least two information transfer terminal pairs in sequence.

Figure 4:
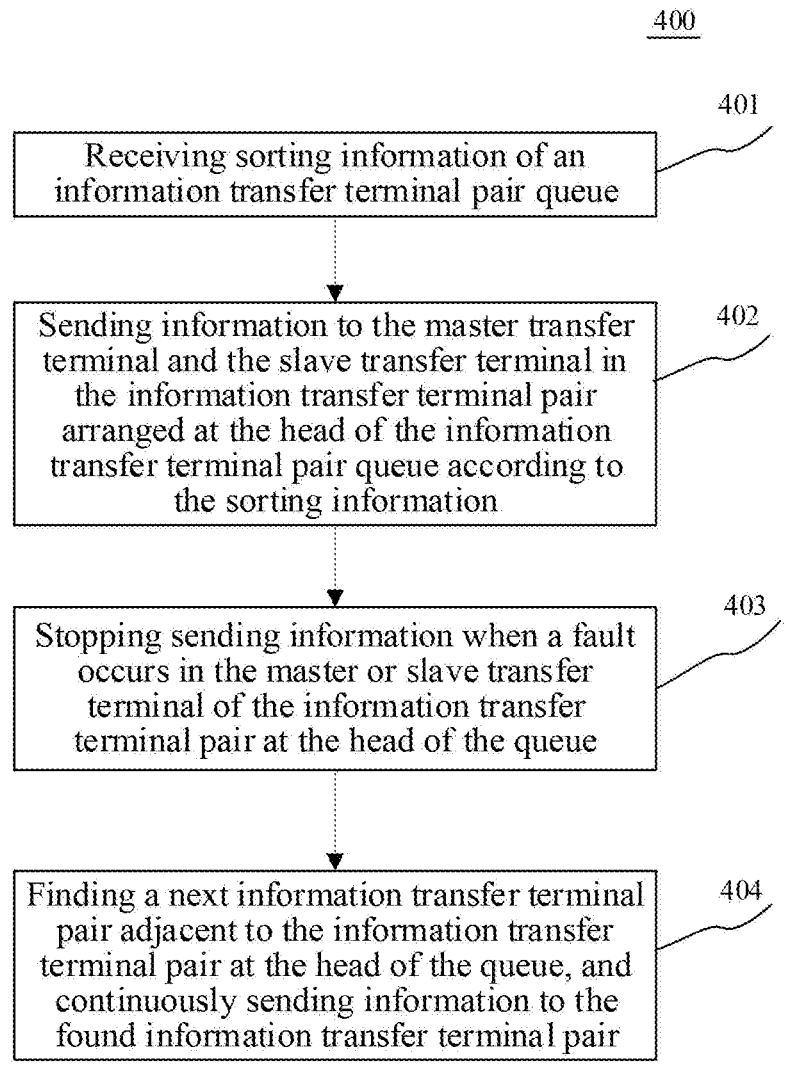
FIG. 4 is a flowchart of an embodiment of the method for sending information according to the present disclosure.

Further refer to FIG. 4, FIG. 4 shows a flow 400 of an embodiment of the method for sending information according to the present disclosure. The method for sending information, provided by the present embodiment, may be executed by the information sending terminal. The method includes the following steps.

Step 401, receiving sorting information of an information transfer terminal pair queue.

In the present embodiment, the information sending terminal on which the method for sending information is performed receives the sorting information of the information transfer terminal pair queue sent by a master control device. At least two information transfer terminal pairs are arranged in the information transfer terminal pair queue according to a preset sequence, each information transfer terminal pair includes a master transfer terminal and a slave transfer terminal, and the master control device is used for managing each information transfer terminal pair in the information transfer terminal pair queue.

Step 402, sending information to the master transfer terminal and the slave transfer terminal in the information transfer terminal pair arranged at the head of the information transfer terminal pair queue according to the sorting information.

In the present embodiment, the information sending terminal finds the information transfer terminal pair arranged at the head of the information transfer terminal pair queue according to the sorting information received in step 401, and sends the information to the master transfer terminal and the slave transfer terminal in the information transfer terminal pair at the head of the queue.

Step 403, stopping sending information when a fault occurs in the master or slave transfer terminal of the information transfer terminal pair at the head of the queue.

In the present embodiment, when a fault occurs in the master or slave transfer terminal of the information transfer terminal pair at the head of the information transfer terminal pair queue, the information sending terminal stops sending information to the master transfer terminal and the slave transfer terminal in the information transfer terminal pair arranged at the head of the queue.

Step 404, finding a next information transfer terminal pair adjacent to the information transfer terminal pair at the head of the queue, and continuously sending information to the found information transfer terminal pair.

In the present embodiment, the information sending terminal finds the next information transfer terminal pair adjacent to the information transfer terminal pair at the head of the queue, and continues to send information to the master transfer terminal and the slave transfer terminal of the found information transfer terminal pair.

The method provided by the above embodiment of the present disclosure realizes the strictly-ordered transmission of information by sending information to the information transfer terminal pair in the information transfer terminal pair queue according to the sorting information.

Figure 5:
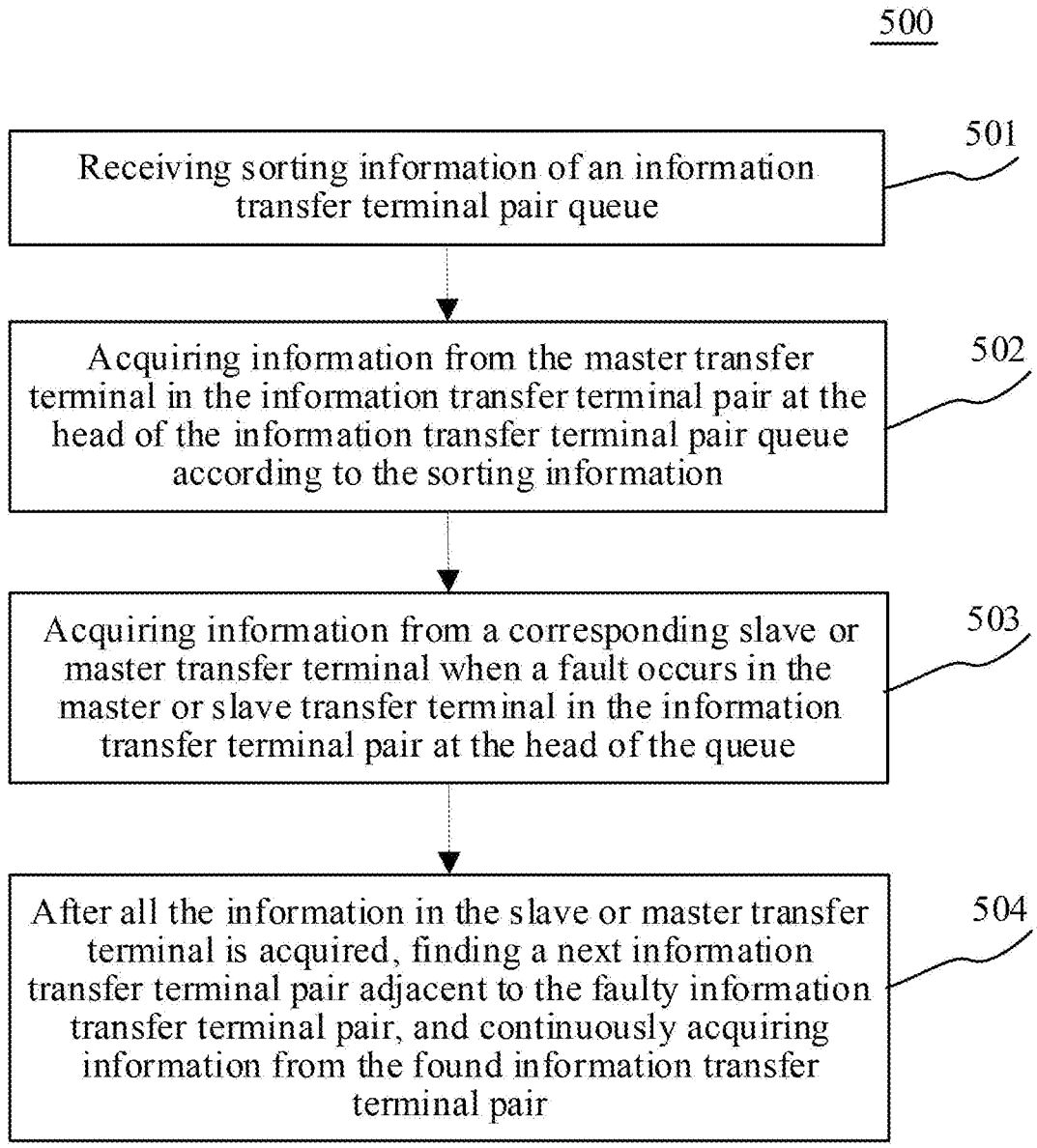
FIG. 5 is a flowchart of an embodiment of the method for acquiring information according to the present disclosure.

Further refer to FIG. 5, FIG. 5 shows a flow 500 of an embodiment of the method for acquiring information according to the present disclosure. The method for acquiring information, provided by the present embodiment, may be executed by the information receiving terminal. The method includes the following steps.

Step 501, receiving sorting information of an information transfer terminal pair queue.

In the present embodiment, the information receiving terminal on which the method for acquiring information is performed receives the sorting information of the information transfer terminal pair queue sent by a master control device. At least two information transfer terminal pairs are arranged in the information transfer terminal pair queue according to a preset sequence, each information transfer terminal pair includes a master transfer terminal and a slave transfer terminal, and the master control device is used for managing each information transfer terminal pair in the information transfer terminal pair queue.

Step 502, acquiring information from the master transfer terminal in the information transfer terminal pair at the head of the information transfer terminal pair queue according to the sorting information.

In the present embodiment, the information receiving terminal acquires information from the master transfer terminal in the information transfer terminal pair arranged at the head of the information transfer terminal pair queue according to the sorting information received in step 501.

Step 503, acquiring information from a corresponding slave or master transfer terminal when a fault occurs in the master or slave transfer terminal in the information transfer terminal pair at the head of the queue.

In the present embodiment, the information receiving terminal acquires information from the slave or master transfer terminal in the information transfer terminal pair when a fault occurs in the master or slave transfer terminal in the information transfer terminal pair arranged at the head of the information transfer terminal pair queue.

Step 504, after all the information in the slave or master transfer terminal is acquired, finding a next information transfer terminal pair adjacent to the faulty information transfer terminal pair, and continuously acquiring information from the found information transfer terminal pair.

In the present embodiment, after the information receiving terminal acquires all the information in the slave or master transfer terminal corresponding to the faulty master transfer terminal in step 503, the information receiving terminal finds the next information transfer terminal pair adjacent to the faulty information transfer terminal pair according to the sorting information, and continues to acquire information from the found information transfer terminal pair.

The method provided by the above embodiment of the present disclosure realizes strictly-ordered acquisition of information by acquiring information from the information transfer terminal pair in the information transfer terminal pair queue according to the sorting information.

Figure 6:
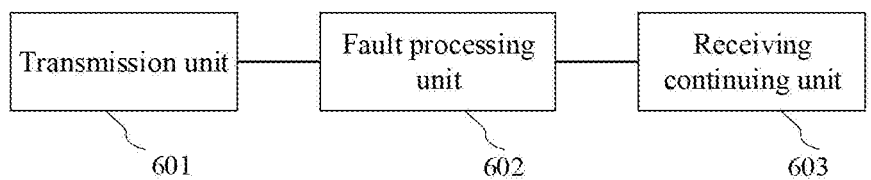
FIG. 6 is a structural diagram of an embodiment of the apparatus for transmitting information according to the present disclosure.

Further refer to FIG. 6, as an implementation of the method shown in the above figures, the present disclosure provides an embodiment of an apparatus for transmitting information, the embodiment of the apparatus corresponds to the embodiment of the method shown in FIG. 2, and the apparatus may be specifically arranged in various types of electronic devices, for example, the apparatus may be arranged in a master control server.

As shown in FIG. 6, the apparatus 600 for transmitting information according to the present embodiment includes a transmission unit 601, a fault processing unit 602, and a receiving continuing unit 603. The transmission unit 601 is configured for using a master transfer terminal and a slave transfer terminal in an information transfer terminal pair arranged at a head of an information transfer terminal pair queue to synchronously receive information sent by an information sending terminal, and using the master transfer terminal to transmit information to an information receiving terminal, at least two information transfer terminal pairs being arranged in the information transfer terminal pair queue according to a preset sequence. The fault processing unit 602 is configured for, when a fault occurs in the master or slave transfer terminal in the information transfer terminal pair at the head of the queue, stopping using the master transfer terminal and slave transfer terminal in the information transfer terminal pair at the head of the queue to receive information, deleting the information transfer terminal pair at the head of the queue from the information transfer terminal pair queue, and inserting the deleted information transfer terminal pair to a tail of the information transfer terminal pair queue after the slave or master transfer terminal in the deleted information transfer terminal pair transmits all the information to the information receiving terminal and the fault of the master or slave transfer terminal is resolved. The receiving continuing unit 603 is configured for, while a fault is occurring in the master or slave transfer terminal in the information transfer terminal pair at the head of the queue, using a next information transfer terminal pair adjacent to the information transfer terminal pair at the head of the queue to continuously receive the formation sent by the information sending terminal.

In the present embodiment, the transmission unit 601 of the apparatus 600 for transmitting information may use the master transfer terminal and the slave transfer terminal in the information transfer terminal pair arranged at the head of the information transfer terminal pair queue to synchronously receive information sent by the information sending terminal, and use the master transfer terminal to transmit the information to the information receiving terminal.

In the present embodiment, the fault processing unit 602 may stop using the master transfer terminal and slave transfer terminal in the information transfer terminal pair at the head of the queue to receive information when a fault occurs in the master or slave transfer terminal in the information transfer terminal pair at the head of the queue, delete the information transfer terminal pair at the head of the queue from the information transfer terminal pair queue, and insert the deleted information transfer terminal pair to the tail of the information transfer terminal pair queue after the slave or master transfer terminal in the deleted information transfer terminal pair transmits all the information to the information receiving terminal and the fault of the master or slave transfer terminal is resolved.

In the present embodiment, the receiving continuing unit 603 may use the next information transfer terminal pair adjacent to the information transfer terminal pair at the head of the queue to continuously receive the information sent by the information sending terminal while a fault is occurring in the master or slave transfer terminal in the information transfer terminal pair at the head of the queue.

It should be appreciated that by those skilled in the art that the apparatus 600 for transmitting information also includes some other well-known structures, such as a processor, a memory, etc., and these well-known structures are not shown in FIG. 6 in order to unnecessarily obscure the embodiments of the present disclosure.

Figure 7:
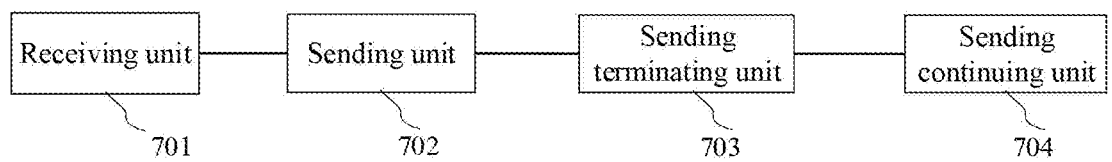
FIG. 7 is a structural diagram of an embodiment of the apparatus for sending information according to the present disclosure.

Further refer to FIG. 7, as an implementation of the method shown in FIG. 4, the present disclosure provides an embodiment of an apparatus for sending information, the embodiment of the apparatus corresponds to the embodiment of the method shown in FIG. 4, and the apparatus is usually arranged in the information sending terminal 101 shown in FIG. 1.

As shown in FIG. 7, the apparatus 700 for sending information in the present, embodiment includes a receiving unit 701, a sending unit 702, a sending terminating unit 703, and a sending continuing unit 704. The receiving unit 701 is configured for receiving sorting information of an information transfer terminal pair queue, at least two information transfer terminal pairs being arranged in the information transfer terminal pair queue according to a preset sequence, and each information transfer terminal pair including a master transfer terminal and a slave transfer terminal. The sending unit 702 is configured for sending information to the master transfer terminal and the slave transfer terminal in the information transfer terminal pair arranged at the head of the information transfer terminal pair queue according to the sorting information; the sending terminating unit 703 is configured for stopping sending the information when a fault occurs in the master or slave transfer terminal in the information transfer terminal pair at the head of the queue; and the sending continuing unit 704 is configured for finding a next information transfer terminal pair adjacent to the information transfer terminal pair at the head of the queue, and continuously sending information to the found information transfer terminal pair.

In the present embodiment, the receiving unit 701 may receive the sorting information of the information transfer terminal pair queue; on the basis of the sorting information received by the receiving unit 701, the sending unit 702 may send the information to the master transfer terminal and the slave transfer terminal in the information transfer terminal pair arranged at the head of the information transfer terminal pair queue; when a fault occurs in the master or slave transfer terminal of the information transfer terminal pair at the head of the queue, the sending terminating unit 703 may stop sending information to the master transfer terminal and the slave transfer terminal in the information transfer terminal pair at the head of the queue. The sending continuing unit 704 may find the next information transfer terminal pair adjacent to the information transfer terminal pair at the head of the queue and continue to send information to the master transfer terminal and the slave transfer terminal of the found information transfer terminal pair.

Figure 8:
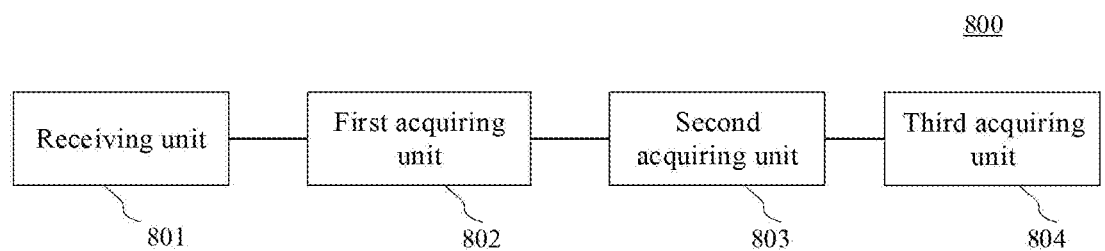
FIG. 8 is a structural diagram of an embodiment of the apparatus for acquiring information according to the present disclosure.

Further refer to FIG. 8, as an implementation of the method shown in FIG. 5, the present disclosure provides an embodiment of an apparatus for acquiring information, the embodiment of the apparatus corresponds to the embodiment of the method shown in FIG. 5, and the apparatus is usually arranged in the information receiving terminal 103 shown in FIG. 1.

As shown in FIG. 8, the apparatus 800 for acquiring information in the present embodiment includes a receiving unit 801, a first acquiring unit 802, a second acquiring unit 803, and a third acquiring unit 804. The receiving unit 801 is configured for receiving sorting information of an information transfer terminal pair queue, at least two information transfer terminal pairs being arranged in the information transfer terminal pair queue according to a preset sequence, and each information transfer terminal pair including a master transfer terminal and a slave transfer terminal. The first acquiring unit 802 is configured for acquiring information from the master transfer terminal in the information transfer terminal pair at a head of the information transfer terminal pair queue according to the sorting information. The second acquiring unit 803 is configured for acquiring information from a corresponding slave or master transfer terminal when a fault occurs in the master or slave transfer terminal in the information transfer terminal pair at the head of the queue. The third acquiring unit 804 is configured for finding a next information transfer terminal pair adjacent to the faulty information transfer terminal pair after all the information in the slave or master transfer terminal is acquired, and continuously acquiring information from the found information transfer terminal pair.

In the present embodiment, the receiving unit 801 may be used for receiving sorting information of the information transfer terminal pair queue; on the basis of the sorting information received by the receiving unit 801, the first acquiring unit 802 may acquire information from the master transfer terminal in the information transfer terminal pair at the head of the information transfer terminal pair queue; the second acquiring unit 803 may acquire information from the slave or master transfer terminal in the information transfer terminal pair when a fault occurs in the master or slave transfer terminal in the information transfer terminal pair at the head of the queue; and the third acquiring unit 804 may find the next information transfer terminal pair adjacent to the faulty information transfer terminal pair after all the information in the slave or master transfer terminal is acquired, and continuously acquire information from the found information transfer terminal pair.

The embodiment of the present disclosure also provides an information transmission system (not shown) which includes a sending terminal, a transferring terminal and a receiving terminal, the sending terminal and the transferring terminal are connected through a network, and the transferring terminal and the receiving terminal are connected through a network. The sending terminal may include the apparatus for sending information described in the corresponding embodiment of FIG. 7, the transferring terminal may include the apparatus for transmitting information described in the corresponding embodiment of FIG. 4, and the receiving terminal may include the apparatus for acquiring information described in the corresponding embodiment of FIG. 8.

Figure 9:
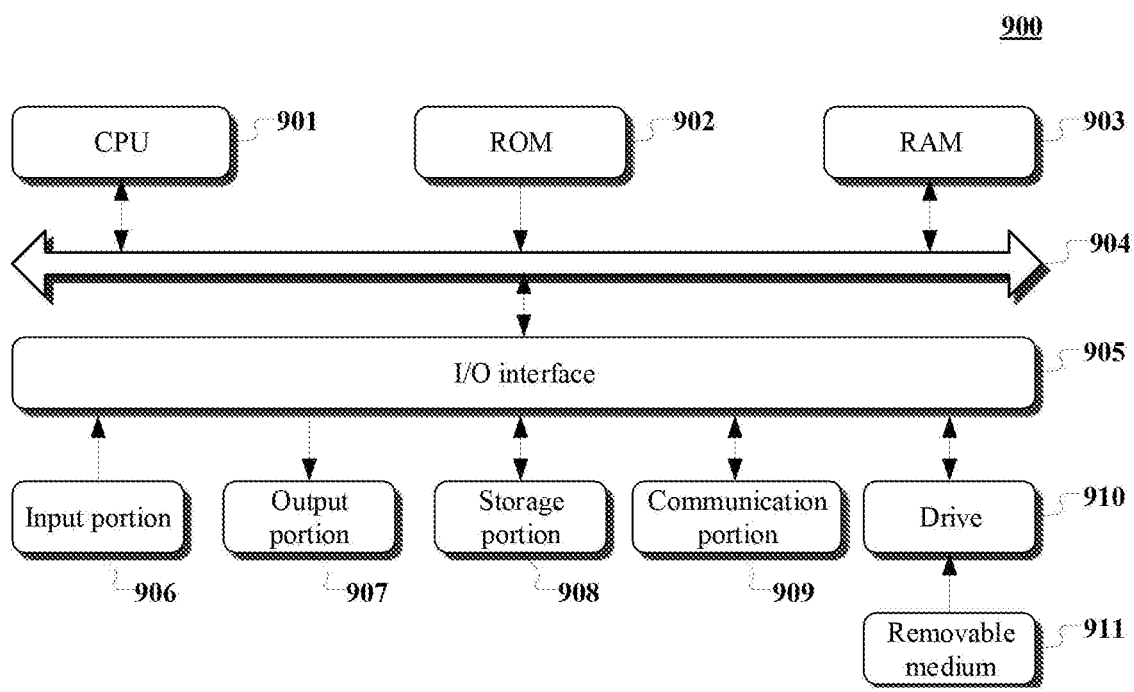
FIG. 9 is a structural diagram of a computer system adapted to implement the information sending terminal, the master transfer terminal, the slave transfer terminal, or the information receiving terminal according to embodiments of the present disclosure.

Referring to FIG. 9, a schematic structural diagram of a computer system 900 adapted to implement the information sending terminal, the master transfer terminal, the slave transfer terminal, or the information receiving terminal according to embodiments of the present disclosure is shown.

As shown in FIG. 9, the computer system 900 includes a central processing unit (CPU) 901, which may execute various appropriate actions and processes in accordance with a program stored in a read-only memory (ROM) 902 or a program loaded into a random access memory (RAM) 903 from a storage portion 908. The RAM 903 also stores various programs and data required by operations of the system 900. The CPU 901, the ROM 902 and the RAM 903 are connected to each other through a bus 904. An input/output (I/O) interface 905 is also connected to the bus 904.

The following components are connected to the I/O interface 905: an input portion 906 including a keyboard, a mouse etc.; an output portion 907 including a cathode ray tube (CRT), a liquid crystal display device (LCD), a speaker etc.; a storage portion 908 including a hard disk and the like; and a communication portion 909 including a network interface card, such as a LAN card and a modem. The communication portion 909 performs communication processes via a network, such as the Internet. A driver 910 is also connected to the I/O interface 905 as required. A removable medium 911, such as a magnetic disk, an optical disk, a magneto-optical disk, and a semiconductor memory, may be installed on the driver 910, to facilitate the retrieval of a computer program from the removable medium 911, and the installation thereof on the storage portion 906 as needed.

In particular, according to an embodiment of the present disclosure, the process described above with reference to the flowchart may be implemented in a computer software program. For example, an embodiment of the present disclosure includes a computer program product, which includes a computer program that is tangibly embedded in a machine-readable medium. The computer program includes program codes for executing the method as illustrated in the flowchart. In such an embodiment, the computer program may be downloaded and installed from a network via the communication portion 909, and/or may be installed from the removable medium 911.

The flowcharts and block diagrams in the accompanying drawings illustrate architectures, functions and operations that may be implemented according to the system, the method and the computer program product of the various embodiments of the present disclosure. In this regard, each block in the flowcharts and block diagrams may represent a module, a program segment, or a code portion. The module, the program segment, or the code portion includes one or more executable instructions for implementing the specified logical function. It should also be noted that, in some alternative implementations, the functions denoted by the blocks may occur in a sequence different from the sequences shown in the accompanying drawings. For example, in practice, two blocks in succession may be executed, depending on the involved functionalities, substantially in parallel, or in a reverse sequence. It should also be noted that, each block in the block diagrams and/or the flowcharts and a combination of the blocks in the block diagrams and/or the flowcharts may be implemented by a dedicated hardware-based system executing specific functions or operations, or by a combination of a dedicated hardware and computer instructions.

The units involved in the embodiments of the present disclosure may be implemented by way of software or hardware. The described units may also be provided in a processor, for example, described as: a processor, including a transmission unit, a fault processing unit, and a receiving continuing unit, where the names of these units are not considered as a limitation to the units under certain circumstances. For example, the transmission unit may also be described as "a unit using a master transfer terminal and a slave transfer terminal in an information transfer terminal pair arranged at a head of an information transfer terminal pair queue to synchronously receive information sent by an information sending terminal, and using the master transfer terminal to transmit the information to an information receiving terminal."

In another aspect, the present disclosure further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: using a master transfer terminal and a slave transfer terminal in an information transfer terminal pair arranged at a head of an information transfer terminal pair queue to synchronously receive information sent by an information sending terminal, and using the master transfer terminal to transmit the information to an information receiving terminal, at least two information transfer terminal pairs being arranged in the information transfer terminal pair queue according to a preset sequence; stopping using the master transfer terminal and slave transfer terminal in the information transfer terminal pair at the head of the queue to receive information when a fault occurs in the master or slave transfer terminal in the information transfer terminal pair at the head of the queue, deleting the information transfer terminal pair at the head of the queue from the information transfer terminal pair queue, and inserting the deleted information transfer terminal pair to a tail of the information transfer terminal pair queue after the slave or master transfer terminal in the deleted information transfer terminal pair transmits all the information to the information receiving terminal and the fault of the master or slave transfer terminal is resolved; and using a next information transfer terminal pair adjacent to the information transfer terminal pair at the head of the queue to continuously receive the information sent by the information sending terminal while a fault is occurring in the master or slave transfer terminal in the information transfer terminal pair at the head of the queue. Or, the one or more programs, when executed by a device, cause the device to: receiving sorting information of an information transfer terminal pair queue, at least two information transfer terminal pairs being arranged in the information transfer terminal pair queue according to a preset sequence, and each information transfer terminal pair comprising a master transfer terminal and a slave transfer terminal; sending information to the master transfer terminal and the slave transfer terminal in the information transfer terminal pair arranged at a head of the information transfer terminal pair queue according to the sorting information; stopping sending information when a fault occurs in the master or slave transfer terminal of the information transfer terminal pair at the head of the queue; and finding a next information transfer terminal pair adjacent to the information transfer terminal pair at the head of the queue, and continuously sending information to the found information transfer terminal pair. Or, the one or more programs, when executed by a device, cause the device to: receiving sorting information of an information transfer terminal pair queue, at least two information transfer terminal pairs being arranged in the information transfer terminal pair queue according to a preset sequence, and each information transfer terminal pair comprising a master transfer terminal and a slave transfer terminal; acquiring information from the master transfer terminal in the information transfer terminal pair at a head of the information transfer terminal pair queue according to the sorting information; acquiring information from a corresponding slave or master transfer terminal when a fault occurs in the master or slave transfer terminal in the information transfer terminal pair at the head of the queue; and after all the information in the slave or master transfer terminal is acquired, finding a next information transfer terminal pair adjacent to the faulty information transfer terminal pair, and continuously acquiring information from the found information transfer terminal pair.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A method for transmitting information, the method comprising:

using a master transfer terminal and a slave transfer terminal in an information transfer terminal pair arranged at a head of an information transfer terminal pair queue to synchronously receive information sent by an information sending terminal, and using the master transfer terminal to transmit the information to an information receiving terminal, at least two information transfer terminal pairs being arranged in the information transfer terminal pair queue according to a preset sequence;

stopping using the master transfer terminal and the slave transfer terminal in the information transfer terminal pair at the head of the queue to receive information when a fault occurs in the master or slave transfer terminal in the information transfer terminal pair at the head of the queue, deleting the information transfer terminal pair at the head of the queue from the information transfer terminal pair queue, and inserting the deleted information transfer terminal pair to a tail of the information transfer terminal pair queue after the slave or master transfer terminal in the deleted information transfer terminal pair transmits all the information to the information receiving terminal and the fault of the master or slave transfer terminal is resolved; and using a next information transfer terminal pair adjacent to the information transfer terminal pair at the head of the queue to continuously receive the information sent by the information sending terminal while a fault is occurring in the master or slave transfer terminal in the information transfer terminal pair at the head of the queue.

2. The method according to claim 1, the method further comprising:

sending sorting information of the information transfer terminal pair queue to the information sending terminal.

3. The method according to claim 1, the method further comprising:

sending sorting information of the information transfer terminal pair queue to the information receiving terminal.

4. A non-volatile computer storage medium, the computer storage medium storing a computer readable instruction executable by a processor, the computer readable instruction, when executed by the processor, causing the processor to perform the method according to claim 1.

5. A method for sending information, the method comprising:

receiving sorting information of an information transfer terminal pair queue, at least two information transfer terminal pairs being arranged in the information transfer terminal pair queue according to a preset sequence, and each information transfer terminal pair comprising a master transfer terminal and a slave transfer terminal;

sending information to the master transfer terminal and the slave transfer terminal in the information transfer terminal pair arranged at a head of the information transfer terminal pair queue according to the sorting information;

stopping sending information when a fault occurs in the master or slave transfer terminal of the information transfer terminal pair at the head of the queue; and finding a next information transfer terminal pair adjacent to the information transfer terminal pair at the head of the queue, and continuously sending information to the found information transfer terminal pair.

6. A non-volatile computer storage medium, the computer storage medium storing a non-transitory computer readable instruction executable by a processor, the computer readable instruction, when executed by the processor, causing the processor to perform the method according to claim 5.

7. A method for acquiring information, the method comprising:

receiving sorting information of an information transfer terminal pair queue, at least two information transfer terminal pairs being arranged in the information transfer terminal pair queue according to a preset sequence, and each information transfer terminal pair comprising a master transfer terminal and a slave transfer terminal;

acquiring information from the master transfer terminal in the information transfer terminal pair at a head of the information transfer terminal pair queue according to the sorting information;

acquiring information from a corresponding slave or master transfer terminal when a fault occurs in the master or slave transfer terminal in the information transfer terminal pair at the head of the queue; and after all the information in the slave or master transfer terminal is acquired, finding a next information transfer terminal pair adjacent to the faulty information transfer terminal pair, and continuously acquiring information from the found information transfer terminal pair.

8. A non-volatile computer storage medium, the computer storage medium storing a non-transitory computer readable instruction executable by a processor, the computer readable instruction, when executed by the processor, causing the processor to perform the method according to claim 7.

9. An apparatus for transmitting information, the apparatus comprising:

at least one processor; and a memory storing instructions, the instructions when executed by the at least one processor, cause the at least one processor to perform operations, the operations comprising:

using a master transfer terminal and a slave transfer terminal in an information transfer terminal pair arranged at a head of an information transfer terminal pair queue to synchronously receive information sent by an information sending terminal, and using the master transfer terminal to transmit the information to an information receiving terminal, at least two information transfer terminal pairs being arranged in the information transfer terminal pair queue according to a preset sequence;

stopping using the master transfer terminal and the slave transfer terminal in the information transfer terminal pair at the head of the queue to receive information when a fault occurs in the master or slave transfer terminal in the information transfer terminal pair at the head of the queue, deleting the information transfer terminal pair at the head of the queue from the information transfer terminal pair queue, and inserting the deleted information transfer terminal pair to a tail of the information transfer terminal pair queue after the slave or master transfer terminal in the deleted information transfer terminal pair transmits all the information to the information receiving terminal and the fault of the master or slave transfer terminal is resolved; and using a next information transfer terminal pair adjacent to the information transfer terminal pair at the head of the queue to continuously receive the information sent by the information sending terminal while a fault is occurring in the master or slave transfer terminal in the information transfer terminal pair at the head of the queue.

10. The apparatus according to claim 9, the operations further comprising:

sending sorting information of the information transfer terminal pair queue to the information sending terminal.

11. The apparatus according to claim 9, the operations further comprising:

sending sorting information of the information transfer terminal pair queue to the information receiving terminal.

12. An information transmission system, the system comprising:
a sending terminal, a transferring terminal and a receiving terminal, the transferring terminal comprising the apparatus according to claim 9,
the sending terminal comprising:
the at least one processor or a further processor; and
a second memory storing a second set of instructions, the second set of instructions when executed by the at least one processor or the further processor, cause the at least one processor or the further processor to perform sending terminal operations, the sending terminal operations comprising:
receiving sorting information of an information transfer terminal pair queue;
sending information to the master transfer terminal and the slave transfer terminal in the information transfer terminal pair arranged at a head of the information transfer terminal pair queue according to the sorting information;
stopping sending information when a fault occurs in the master or slave transfer terminal of the information transfer terminal pair at the head of the queue; and
finding a next information transfer terminal pair adjacent to the information transfer terminal pair at the head of the queue, and continuously sending information to the found information transfer terminal pair, and
the receiving terminal comprising:
the at least one processor or an other processor; and
a third memory storing a third set of instructions, the third set of instructions when executed by the at least one processor or the other processor, cause the at least one processor or the other processor to perform receiving terminal operations, the receiving terminal operations comprising:
acquiring information from the master transfer terminal in the information transfer terminal pair at the head of the information transfer terminal pair queue according to the sorting information;
acquiring information from a corresponding slave or master transfer terminal when a fault occurs in the master or slave transfer terminal in the information transfer terminal pair at the head of the queue; and
after all the information in the slave or master transfer terminal is acquired, finding a next information transfer terminal pair adjacent to the faulty information transfer terminal pair, and continuously acquiring information from the found information transfer terminal pair.

13. An apparatus for sending information, the apparatus comprising:
at least one processor; and
a memory storing instructions, the instructions when executed by the at least one processor, cause the at least one processor to perform operations, the operations comprising:
receiving sorting information of an information transfer terminal pair queue, at least two information transfer terminal pairs being arranged in the information transfer terminal pair queue according to a preset sequence, and each information transfer terminal pair comprising a master transfer terminal and a slave transfer terminal;
sending information to the master transfer terminal and the slave transfer terminal in the information transfer terminal pair arranged at a head of the information transfer terminal pair queue according to the sorting information;
stopping sending information when a fault occurs in the master or slave transfer terminal of the information transfer terminal pair at the head of the queue; and
finding a next information transfer terminal pair adjacent to the information transfer terminal pair at the head of the queue, and continuously sending information to the found information transfer terminal pair.

14. An apparatus for acquiring information, the apparatus comprising:
at least one processor; and
a memory storing instructions, the instructions when executed by the at least one processor, cause the at least one processor to perform operations, the operations comprising:
receiving sorting information of an information transfer terminal pair queue, at least two information transfer terminal pairs being arranged in the information transfer terminal pair queue according to a preset sequence, and each information transfer terminal pair comprising a master transfer terminal and a slave transfer terminal;
acquiring information from the master transfer terminal in the information transfer terminal pair at a head of the information transfer terminal pair queue according to the sorting information;
acquiring information from a corresponding slave or master transfer terminal when a fault occurs in the master or slave transfer terminal in the information transfer terminal pair at the head of the queue; and
after all the information in the slave or master transfer terminal is acquired, finding a next information transfer terminal pair adjacent to the faulty information transfer terminal pair, and continuously acquiring information from the found information transfer terminal pair.

* * * * *